(12) United States Patent
Chao

(10) Patent No.: US 7,946,254 B2
(45) Date of Patent: May 24, 2011

(54) PET EAR LIFTER

(76) Inventor: Albert Chao, Saddle River, NJ (US)

( * ) Notice: Subject to any disclaimer, the term of this patent is extended or adjusted under 35 U.S.C. 154(b) by 177 days.

(21) Appl. No.: 12/538,968

(22) Filed: Aug. 11, 2009

(65) Prior Publication Data

US 2011/0036306 A1 Feb. 17, 2011

(51) Int. Cl.
*A01K 15/00* (2006.01)
*A01K 13/00* (2006.01)

(52) U.S. Cl. .......... 119/814; 119/850; 119/856

(58) Field of Classification Search .......... 119/814, 119/856, 863, 850, 860, 837, 851, 865, 712; 2/338, 309, 311, 312, 313–318, 321, 322, 2/336, 301, 306, 170, 920, 917, 271; 128/864, 128/866, 878, 879; 224/148.6, 220, 251; 606/204.15; *A01K 17/00, 13/00, 15/00, 15/02, A01K 15/04, 27/00, 29/00*
See application file for complete search history.

(56) References Cited

U.S. PATENT DOCUMENTS

| | | | |
|---|---|---|---|
| 3,257,990 A | 6/1966 | Robertson et al. | |
| 3,295,501 A * | 1/1967 | Riley | 119/770 |
| 4,103,450 A * | 8/1978 | Whitcomb | 43/131 |
| 4,148,279 A | 4/1979 | Hoytt | |
| 4,233,942 A | 11/1980 | Williams | |
| 4,964,264 A | 10/1990 | Adams | |
| 5,920,912 A | 7/1999 | Patchett | |
| 6,272,691 B1 * | 8/2001 | Henricksen et al. | 2/338 |
| 6,314,961 B1 | 11/2001 | Barnes | |
| 6,502,532 B2 | 1/2003 | Sjolin | |
| 6,508,203 B2 | 1/2003 | Williams | |
| 6,916,104 B2 * | 7/2005 | Parsons et al. | 362/191 |
| 7,398,559 B2 * | 7/2008 | Flatt | 2/181 |
| 7,441,516 B2 | 10/2008 | Sharpe | |
| 7,516,718 B2 | 4/2009 | Weinblatt | |
| 7,753,007 B1 * | 7/2010 | Anderson | 119/721 |
| 2002/0092530 A1 * | 7/2002 | Chapman | 128/878 |
| 2004/0037072 A1 * | 2/2004 | Parsons et al. | 362/191 |
| 2005/0087197 A1 * | 4/2005 | Kelly | 128/892 |

* cited by examiner

*Primary Examiner* — Son T Nguyen
*Assistant Examiner* — Kathleen Iwasaki
(74) *Attorney, Agent, or Firm* — Notaro, Michalos & Zaccaria P.C.

(57) ABSTRACT

A pair of closed endless elastic rings connected to each other by a length adjustable band lifts the bases of the ears of a floppy eared pet, away from the pet's head and away for the openings to the pet's ear canals to reduce problems of the ear canals such as bacterial and fungal growth.

10 Claims, 4 Drawing Sheets

PET EAR LIFTER

FIELD AND BACKGROUND OF THE INVENTION

The present invention relates generally to the field of pet care, and, in particular, to a new and useful pet ear lifting apparatus that helps reduce ear problems in pets, particularly dogs with floppy ears that tend to cover the dogs ear canals.

Dogs with long or floppy ears, such as poodles, collies and many other breeds, are prone to ear infections due to the warm, dark, moist environment created inside their ear canals by the ears that cover the openings to the canals. This environment advances bacterial and fungal, e.g. yeast, growth. Symptoms of a yeast infection include intense itching, scaly, oozing skin, head shaking, redness, swelling and ear discharge. Yeast infections also have a tendency to spread to other parts of the body.

Bacterial infections occur in a similar manner as yeast fungus so that when the conditions are right, the bacteria grows at a rapid rate and faster than the dog's immune system can control. Symptoms of a dog with a bacterial ear infection include head shaking, head tilting, discharge, redness, odor and swelling of the ear canal. If left untreated, the infection will progress, affecting the inner ear. When this occurs, the dog's vestibular system can be affected, causing balance problems, even nausea, vomiting and other symptoms similar to those experienced by a human who is suffering from vertigo.

Preventative measures include daily cleaning of the dog's ears using a good quality ear cleaning solution and proper ear cleaning techniques to remove any moisture, yeast or bacteria. Removing hair from the dog's ears will also help as will as removing hair from in and around the ear canal to improve air flow.

The present invention avoids these measures by reducing the moist dark environment in the ear canals simply by slightly lifting the base of the ears away for the dog's head.

U.S. Pat. No. 4,233,942 to Williams discloses a device for protecting the ears of animals, especially long-haired dogs, from becoming soiled by the animal's food while the animal is eating. The device provides a rolled tubular member for containing an elongated part of each ear, and a pair of straps connected between upper and lower parts of the tubular members for keeping the members and the parts of the ears therein, extended out horizontally and therefore away for the pet's food.

The shape and placement of the tubular members appear to cover the openings into the dog's ear canals so that the undesirable, bacteria and fungus growing environment is maintained. The device is also rather unsightly and not appropriate for keeping on the pet at any times other that meal times.

Also see U.S. Pat. No. 6,314,961 to Barnes for an adjustable ear support and U.S. Pat. No. 6,502,532 to Sjölin for an animal bandage device.

A simple, inexpensive and effecting apparatus for reducing ear problems in floppy eared pets remains.

SUMMARY OF THE INVENTION

It is an object of the present invention to provide an apparatus made up of a pair of elastic loops connected to each other by a length adjustable band that lift the bases of the ears of a floppy eared pet, away from the pet's head and away for the openings to the pet's ear canals to reduce problems of the ear canals.

A further object of the invention is to provide an apparatus for lifting the bases of the ears of a floppy eared pet, away from the pet's head and away for the openings to the pet's ear canals, to reduce problems of the ear canals, that consisting essentially of: a first closed elastic ring having an inside diameter of about one to two inches for receiving the base of one floppy ear of a pet, the first ring being made of an elongated ring material having a cross section that is one of round, oval and ribbon shape with a maximum outside diameter of about one eighth to one half inch so that only a short portion of the one floppy ear at the base of the one floppy ear is in the first ring and the opening to the ear canal under the one floppy ear is not covered, and a second closed elastic ring having an inside diameter of about one to two inches for receiving the base of the other floppy ear of the pet, the second ring being made of an elongated ring material having a cross section that is one of round, oval and ribbon shape with a maximum outside diameter of about one eighth to one half inch so that only a short portion of the other floppy ear at the base of the other ear is in the second ring and the opening to the ear canal under the other floppy ear is not covered.

A single connecting band is connected between the first and second rings for extending over the head of the pet, between the one and the other floppy ears, for maintaining a selected distance between the rings for raising the floppy ears away from the openings to the ear canals. Length adjusting means are connected to the band for adjusting the length of the band between the rings to adjust the selected distance. The connecting band preferably has a first loop at one end of the band for engaging around the first ring for fixing the first ring to the one end of the band, an opposite end of the connecting band being looped around the second ring for connecting the band to the second ring. The opposite end of the band overlays an intermediate portion of the band at a location between the rings.

The length adjusting means advantageously comprise mating fasteners at the intermediate portion of the band and at the opposite end of the band for mating with each other at a plurality of different relative positions for adjusting the length of the band between the rings to adjust the selected distance, and a retaining cord is connected between the second ring and the intermediate portion of the band for retaining the second ring to the band even when the mating fasteners are not mated with each other.

The mating fasteners preferably comprise a hook fastener tape on one of the intermediate portion and the opposite end of the band, and a loop fastener tape on the other one of the intermediate portion and the opposite end of the band for mating with the hook fastener tape. The ring material for each ring preferably has an elastic core and a fabric outer surface for comfort to the pet.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
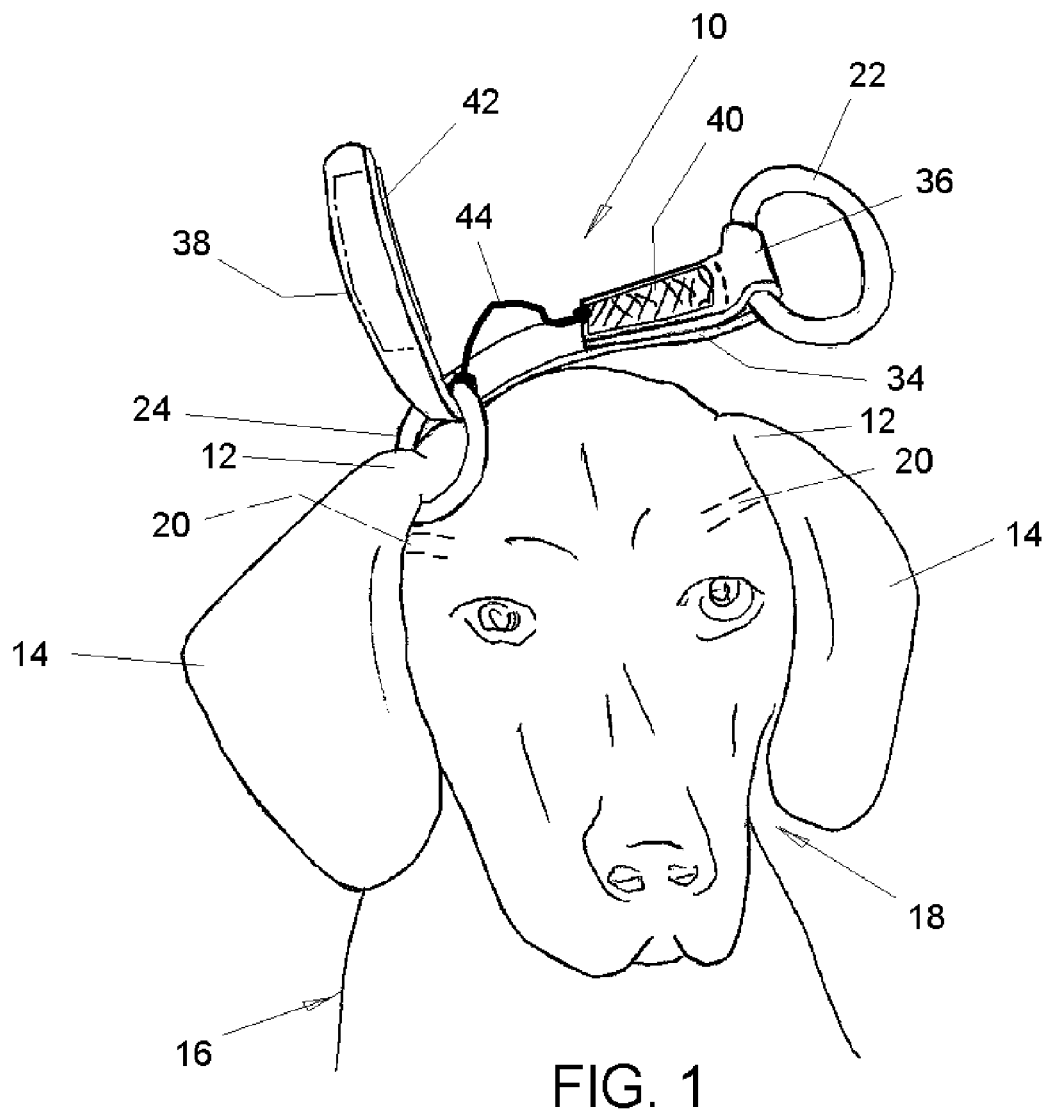
FIG. 1 is a front elevational view of the pet ear lifting apparatus of the invention during a first step of installing the apparatus on the floppy ears of a dog.

Referring now to the drawings, in which like reference numerals are used to refer to the same or similar elements, FIG. 1 shows an apparatus 10 for lifting the bases 12 of the floppy ears 14 of a floppy eared dog 16, away from the pet's head 18 and away for the openings to the pet's ear canals 20, to reduce the known problems of the ear canals for such pets.

The apparatus is simple and is made up of first and second closed and endless elastic rings 22 and 24, each having an inside diameter of about one to two inches that is therefore large enough for receiving the base 12 of one floppy ear 14 of the pet 10, without discomfort to the pet, but small enough to closely engaged the base of the ear without covering the ear canal opening. To install the apparatus on the pet, either one of the ears is gently inserted into one of the rings 22 or 24 as shown in FIG. 1. For added comfort to the pet, each ring 22 and 24 is a closed or endless loop of elastic, preferably fabric covered material.

Figure 3:
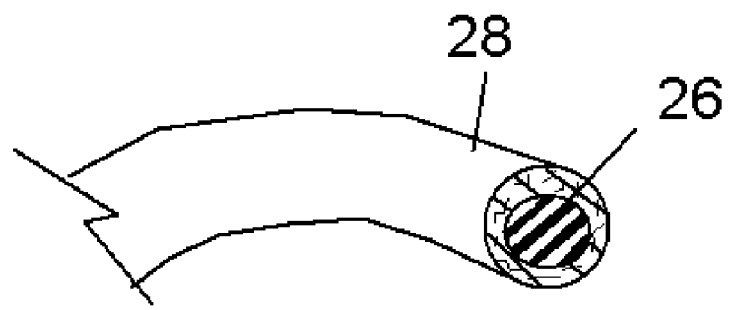
FIGS. 3, 4 and 5 are sectional views illustrating three embodiments of cross sections of the material of the rings of the apparatus.
Figure 4:
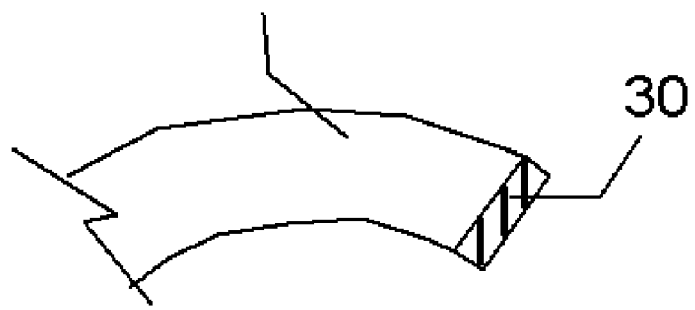
Figure 5:
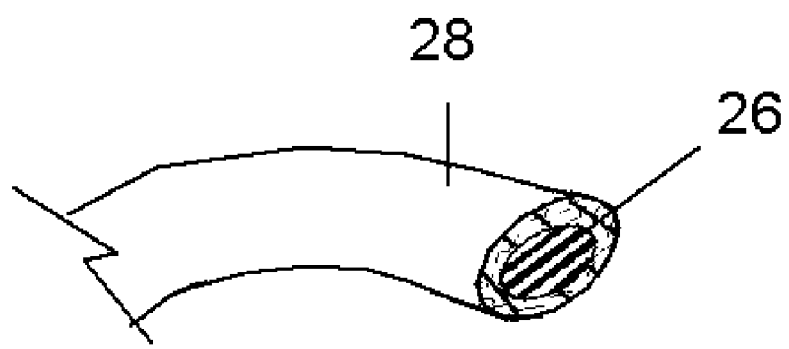

As shown in FIGS. 3, 4 and 5, the elongated ring material has a cross section that is either round (FIG. 3), oval (FIG. 5) or ribbon shape (FIG. 4) with a maximum outside diameter of about one eighth to one half inch so that only a short portion of the one floppy ear 14 at the base 12 of the one floppy ear, is in the ring and the opening to the ear canal 20 under the one floppy ear 14, is not covered by the ring. The ring material has an elastic, e.g. rubber, core 26, with a fabric cover 28 as in FIGS. 3 and 5, for example, or an elastic core 30 with a flocked surface 32 for a fabric-like covering as in FIG. 4. In this way catching and pulling of the pet's hair is avoided when the apparatus in installed and removed and while it is being worn.

Figure 2:
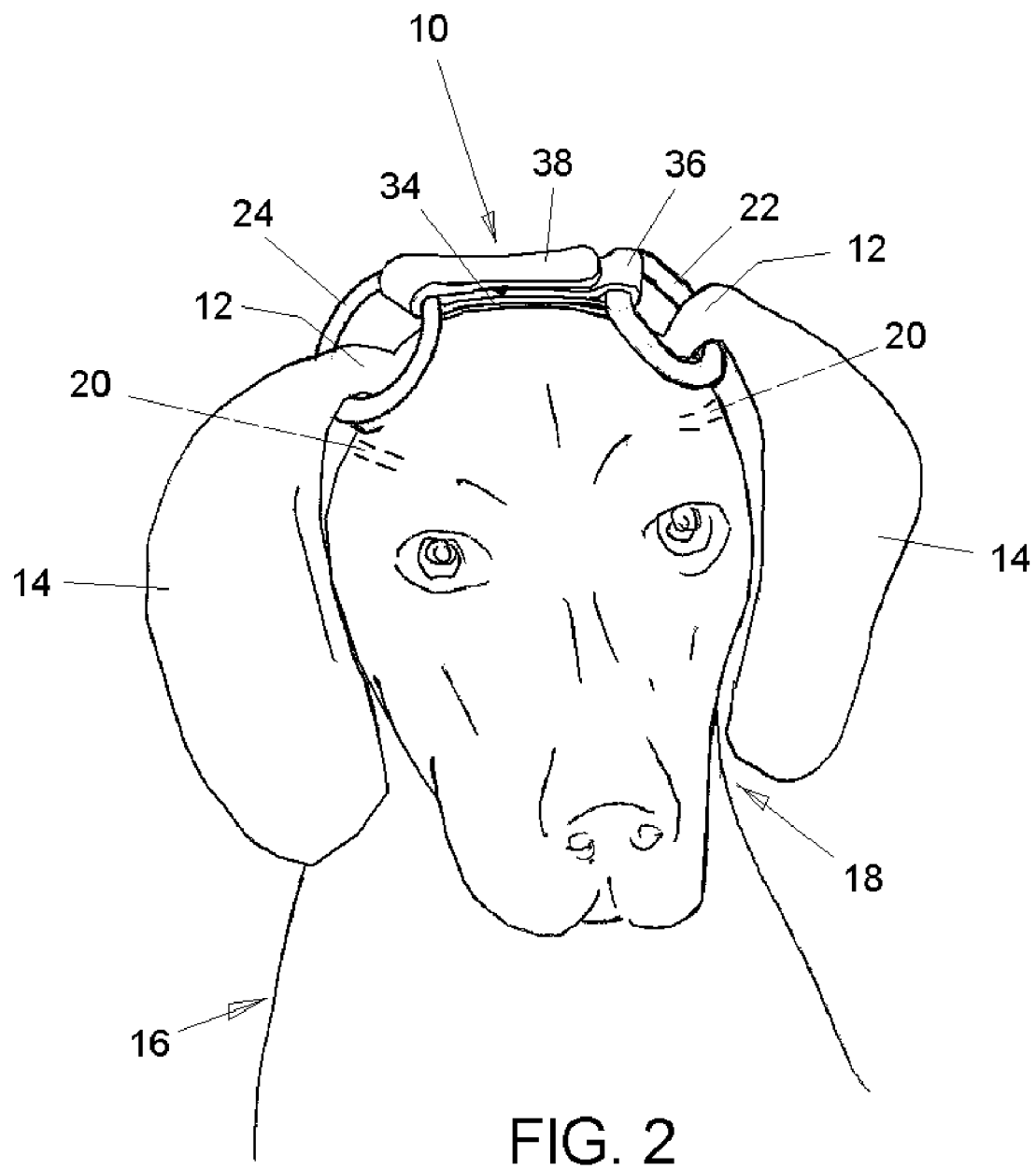
FIG. 2 is a view similar to FIG. 1 of the apparatus fully installed so as to raise the ears away of the dogs head and, in particular, away from the openings to the dog's ear canals.

Once one of the rings 22 or 24 is engages over the base of one ear 14, the other ring is engaged over the base of the other ears as shown in FIG. 2.

A single connecting band 34 is connected between the first and second rings 22 and 24, for extending only over the top of the head 18 of the pet 16, between the floppy ears 14, for maintaining a selected distance between the rings for raising the floppy ears away from the openings to the ear canals 20.

Length adjusting means are connected to the band for adjusting the length of the band 34 between the rings to adjust the selected distance so that pets of different sizes can be served by the same apparatus and the distance is adjusted to make sure the ear canals are not covered and that the base of the ears are lifted slightly away from the pets head.

The connecting band preferably has a first loop 36 at one end of the band for engaged around the first ring 22 for fixing the first ring to this one end of the band 34. The opposite end 38 of the connecting band 34 is looped into and around the second ring 24 for connecting the band to the second ring, the opposite end of the band overlaying an intermediate portion of the band at a location between the rings 22 and 24 as also shown in FIG. 2.

The length adjusting means preferably comprises mating fasteners such as hook and loop tape fasteners known by the trademark VELCRO, at the intermediate portion of the band at 40 and at the opposite end 38 of the band at 42, for mating with each other at a plurality of different relative positions for adjusting the length of the band between the rings to adjust the selected distance as needed for the particular dog.

Although the first ring 22 cannot be lost because it is fixed by band loop 36 to the band 34, to avoid losing the second ring 24, a retaining cord 44 is connected between the second ring 24 and the intermediate portion of the band 34 for retaining the second ring to the band even when the mating fasteners are not mated with each other.

Figure 6:
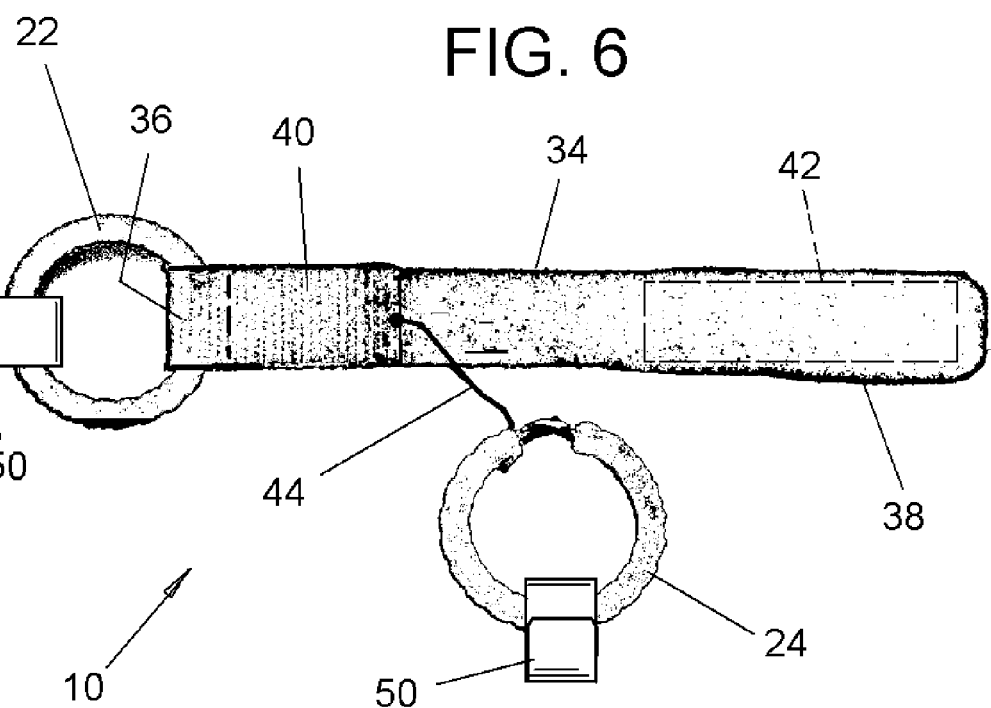
FIG. 6 is a top plan view of the apparatus in an open condition and also illustrating another feature of the invention.

Referring now to FIG. 6, the second ring 24 is shown connected by its cord 44 to the rest of the apparatus but removed from around band 34. In this condition the apparatus which is all made of machine-washable materials, can be washed without fear of losing any parts.

FIG. 6 also illustrates the use of a pair of medicated and/or deodorizing pads 50 that are each made of loops of fabric having, for example, mated hook and loop fasteners at their opposite ends to removably engage around the respective rings 22 and 24. The pads 50 are loosely engaged around each ring 22 and 24 so that when the apparatus in placed on the pet as in FIG. 2, the pads 50 will rest at the bottom of each ring due to gravity and be near the openings of the pets ear canals 20. By impregnating each fabric pad with any known medication or deodorant that is safe for use on pets, or by providing a permeable pouch or reservoir on or in each pads for the medication or deodorant, the medication or deodorant acts on and near the pets ear canals 20 and can be used, for example, to treat an ear infection or the odor commonly coming for the pet's ears.

The medication or deodorant is here collectively called an active impregnate, and examples of active impregnates in or on pads 50 are: Kinetic Conquer Hy-Otic Ear Rinse; R-7 Ear Cleaner by Gimborn; 8 in 1 Excel Ear Cleansing Pads; Fresh'n Clean Cologne by Lambert Kay; Pet Head Poof! Magical Deodorizing Spray for Dogs; and Unleash Pure Joy Clean & Freshen Deodorizing Spray. These products are given as examples only and are available online from www-.petsmart.com.

While specific embodiments of the invention have been shown and described in detail to illustrate the application of the principles of the invention, it will be understood that the invention may be embodied otherwise without departing from such principles.

What is claimed is:

1. An apparatus for lifting the bases of the ears of a floppy eared pet, away from the pet's head and away from the openings to the pet's ear canals, to reduce problems of the ear canals, consisting essentially of:

a first closed elastic ring having an inside diameter of about one to two inches receiving the base of one floppy ear of a pet, the first ring being made of an elongated ring material having a cross section that is one of round, oval and ribbon shape with a maximum outside diameter of about one eighth to one half inch so that only a short portion of the one floppy ear at the base of the one floppy ear is in the first ring and the opening to the ear canal under the one floppy ear is not covered;

a second closed elastic ring having an inside diameter of about one to two inches receiving the base of the other floppy ear of the pet, the second ring being made of an elongated ring material having a cross section that is one of round, oval and ribbon shape with a maximum outside diameter of about one eighth to one half inch so that only a short portion of the other floppy ear at the base of the other ear is in the second ring and the opening to the ear canal under the other floppy ear is not covered;

a single connecting band connected between the first and second rings for extending over the head of the pet, between the one and the other floppy ears, for maintaining a selected distance between the rings for raising the floppy ears away from the openings to the ear canals;

length adjusting means connected to the band for adjusting the length of the band between the rings to adjust the selected distance;

the connecting band having a first loop at one end of the band for engaging around the first ring for fixing the first ring to the one end of the band, an opposite end of the connecting band being looped around the second ring for connecting the band to the second ring, the opposite end of the band overlaying an intermediate portion of the band at a location between the rings;

the length adjusting means comprising mating fasteners at the intermediate portion of the band and at the opposite end of the band for mating with each other at a plurality of different relative positions for adjusting the length of the band between the rings to adjust the selected distance;

a retaining cord connected between the second ring and the intermediate portion of the band for retaining the second ring to the band even when the mating fasteners are not mated with each other;

the mating fasteners comprising a hook fastener tape on one of the intermediate portion and the opposite end of the band, and a loop fastener tape on the other one of the intermediate portion and the opposite end of the band for mating with the hook fastener tape; and the ring material for each ring having an elastic core and a fabric outer surface.

2. The apparatus of claim 1, including a pad removably and loosely engaged around each ring, each pad containing at least one active impregnate for medicating or deodorizing the pet near the openings of the pet's ear canals.

3. An apparatus for lifting the bases of the ears of a floppy eared pet, away from the pet's head and away from the openings to the pet's ear canals, to reduce problems of the ear canals, consisting essentially of:

a first closed elastic ring having an inside diameter of about one to two inches receiving the base of one floppy ear of a pet, the first ring being made of an elongated ring material having a cross section that is one of round, oval and ribbon shape with a maximum outside diameter of about one eighth to one half inch so that only a short portion of the one floppy ear at the base of the one floppy ear is in the first ring and the opening to the ear canal under the one floppy ear is not covered;

a second closed elastic ring having an inside diameter of about one to two inches receiving the base of the other floppy ear of the pet, the second ring being made of an elongated ring material having a cross section that is one of round, oval and ribbon shape with a maximum outside diameter of about one eighth to one half inch so that only a short portion of the other floppy ear at the base of the other ear is in the second ring and the opening to the ear canal under the other floppy ear is not covered;

a single connecting band connected between the first and second rings for extending over the head of the pet, between the one and the other floppy ears, for maintaining a selected distance between the rings for raising the floppy ears away from the openings to the ear canals; and length adjusting means connected to the band for adjusting the length of the band between the rings to adjust the selected distance.

4. The apparatus of claim 3, including a pad removably and loosely engaged around each ring, each pad containing at least one active impregnate for medicating or deodorizing the pet near the openings of the pet's ear canals.

5. The apparatus of claim 3, wherein the connecting band has a first loop at one end of the band for engaging around the first ring for fixing the first ring to the one end of the band, an opposite end of the connecting band being looped around the second ring for connecting the band to the second ring, the opposite end of the band overlaying an intermediate portion of the band at a location between the rings, the length adjusting means comprising mating fasteners at the intermediate portion of the band and at the opposite end of the band for mating with each other at a plurality of different relative positions for adjusting the length of the band between the rings to adjust the selected distance.

6. The apparatus of claim 5, wherein the mating fasteners comprise a hook fastener tape on one of the intermediate portion and the opposite end of the band, and a loop fastener tape on the other one of the intermediate portion and the opposite end of the band for mating with the hook fastener tape.

7. The apparatus of claim 3, wherein the ring material for each ring has an elastic core and a fabric outer surface.

8. An apparatus for lifting the bases of the ears of a floppy eared pet, away from the pet's head and away from the openings to the pet's ear canals, to reduce problems of the ear canals, consisting essentially of:

a first closed elastic ring having an inside diameter of about one to two inches receiving the base of one floppy ear of a pet, the first ring being made of an elongated ring material having a cross section that is one of round, oval and ribbon shape with a maximum outside diameter of about one eighth to one half inch so that only a short portion of the one floppy ear at the base of the one floppy ear is in the first ring and the opening to the ear canal under the one floppy ear is not covered;

a second closed elastic ring having an inside diameter of about one to two inches receiving the base of the other floppy ear of the pet, the second ring being made of an elongated ring material having a cross section that is one of round, oval and ribbon shape with a maximum outside diameter of about one eighth to one half inch so that only a short portion of the other floppy ear at the base of the other ear is in the second ring and the opening to the ear canal under the other floppy ear is not covered;

a single connecting band connected between the first and second rings for extending over the head of the pet, between the one and the other floppy ears, for maintaining a selected distance between the rings for raising the floppy ears away from the openings to the ear canals;

length adjusting means connected to the band for adjusting the length of the band between the rings to adjust the selected distance;

the connecting band having a first loop at one end of the band for engaging around the first ring for fixing the first ring to the one end of the band, an opposite end of the connecting band being looped around the second ring for connecting the band to the second ring, the opposite end of the band overlaying an intermediate portion of the band at a location between the rings;

the length adjusting means comprising mating fasteners at the intermediate portion of the band and at the opposite end of the band for mating with each other at a plurality of different relative positions for adjusting the length of the band between the rings to adjust the selected distance;

a retaining cord connected between the second ring and the intermediate portion of the band for retaining the second ring to the band even when the mating fasteners are not mated with each other; and a pad removably and loosely engaged around each ring, each pad containing at least one active impregnate for medicating or deodorizing the pet near the openings of the pet's ear canals.

9. The apparatus of claim 8, wherein the mating fasteners comprise a hook fastener tape on one of the intermediate portion and the opposite end of the band, and a loop fastener tape on the other one of the intermediate portion and the opposite end of the band for mating with the hook fastener tape.

10. The apparatus of claim 8, wherein the ring material for each ring has an elastic core and a fabric outer surface.

* * * * *